Aug. 21, 1928.
O. P. ERICKSON
1,681,328
VALVE
Filed May 10, 1927   2 Sheets-Sheet 2
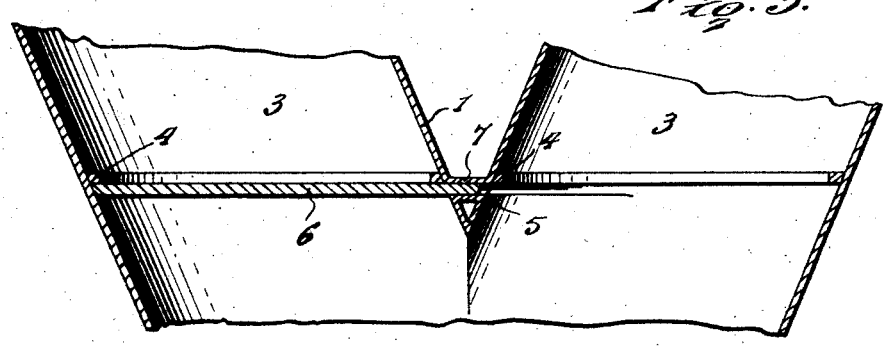
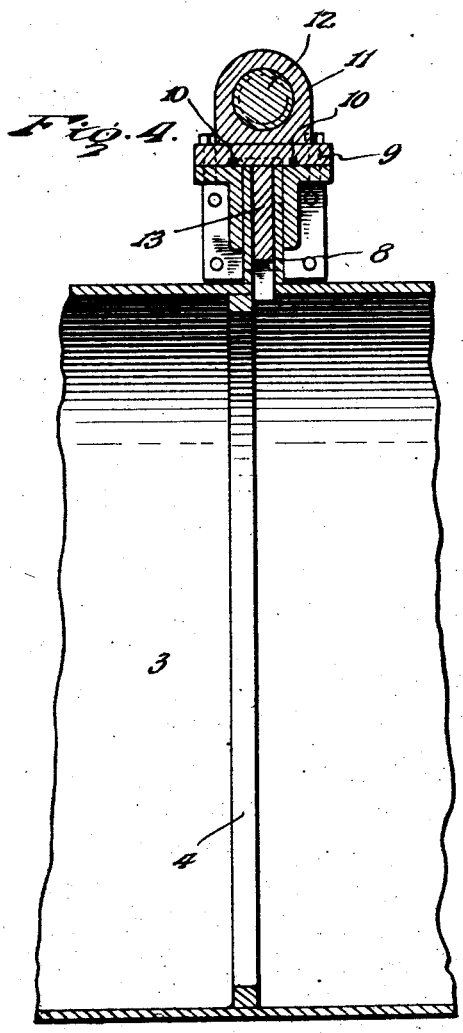
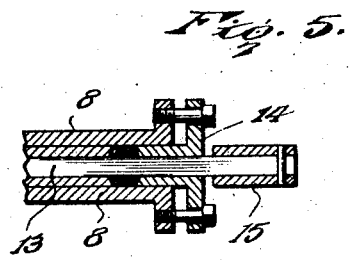
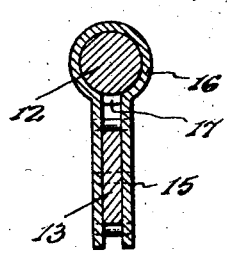
Inventor
O. P. Erickson.
By Lacey & Lacey, Attorneys Patented Aug. 21, 1928.

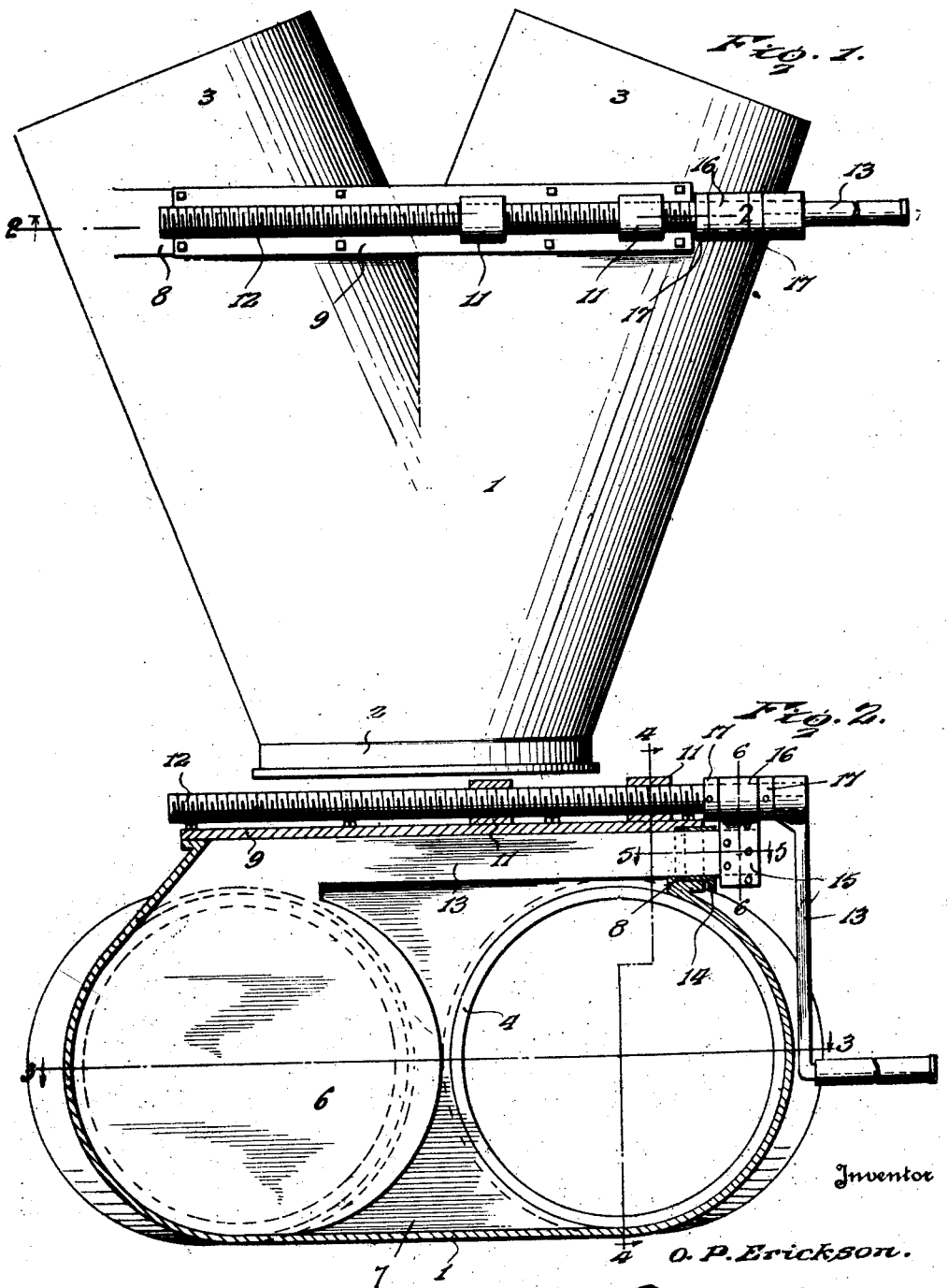

1,681,328

UNITED STATES PATENT OFFICE.

OLE P. ERICKSON, OF WILDWOOD, NEW JERSEY.

VALVE.

Application filed May 10, 1927. Serial No. 190,279.

This invention is a gate valve for use where an absolutely tight closure is not necessary and where a flowing stream is to be diverted from a main conduit or supply into one or another of diverging distributing conduits. The object of the invention is to provide a novel simple construction whereby the valve may be easily operated and may be readily removed when repairs, cleaning or other attention is desirable. The invention is illustrated in the accompanying drawings and consists in certain novel features which will be particularly pointed out in the appended claims.

In the drawings:

Figure 1 is a plan view of a gate valve embodying my invention;

Fig. 2 is a transverse section of the same on the line 2—2 of Fig. 1;

Fig. 3 is a horizontal section on the line 3—3 of Fig. 2;

Fig. 4 is an enlarged vertical section on the line 4—4 of Fig. 2;

Fig. 5 is an enlarged detail section on the line 5—5 of Fig. 2, and

Fig. 6 is a detail section on the line 6—6 of Fig. 2.

In the drawings, the reference numeral 1 indicates a Y-coupling, to the inlet end 2 of which a supply pipe may be connected in any convenient manner, and to the branches 3 of which discharge conduits may be likewise connected in any convenient manner. Within each of the outlets 3, adjacent the junction of the same with the inlet portion of the coupling, a ring 4 is secured by welding or brazing or otherwise, and in the adjacent sides of the outlet are formed openings, indicated at 5, through which the valve 6 may play, the said openings being at opposite ends of a tubular web 7 connecting the outlets, as shown most clearly in Fig. 3, so that leakage will be avoided. On the upper side of the Y-coupling is formed a box 8 consisting of vertical webs arranged in parallelism and furnishing communication between their lower edges with the interior of the outlets of the coupling. A cover 9 is bolted or otherwise rigidly secured upon the upper edges of the said webs and suitable packing, indicated at 10, is interposed between the cover and the top flanges of the webs so that leakage will be prevented. On the upper side of the cover are fixed nuts 11 in which is engaged a threaded shaft 12 which extends beyond one side of the box and at said end is equipped with a convenient handle 13 whereby it may be rotated. It is obvious that rotation of the threaded shaft will cause it to ride endwise through the fixed nuts 11 so that it may be shifted to set the valve across either of the outlets as may be required. The valve consists of a disk of proper diameter to entirely close the passage through either outlet of the Y-coupling, and extending from the upper edge portion of the said disk is a stem 13 which is disposed substantially tangential to the disk and fits within the box 8, as clearly shown in Figs. 2 and 4. This stem projects through one end of the box and a stuffing box 14 is fitted in the said end of the box 8 so that leakage around the stem of the valve will be prevented. At the outer side of the stuffing box 14, the valve stem 13 has rigidly secured thereto a clamp or hanger member 15 which projects vertically above the stem and is formed into a collar or sleeve 16 encircling the shaft 12 and held against relative movement along the shaft by stop collars 17 secured to the shaft at opposite sides of the sleeve. It will thus be seen that, when the shaft is rotated so as to move endwise, the valve will be likewise moved and accordingly set to cut off the flow through either of the outlets 3.

It will be noted, more particularly upon reference to Figs. 2 and 3, that the valve is disposed in such relation to the rings 4 that the pressure of the liquid or other matter flowing through the conduit will hold the valve to the ring in the outlet which is to be closed and the valve will, therefore, be seated sufficiently close to avoid any appreciable leakage. The valve stem 13 may move easily within the box 8 and through the web 7 but at the same time will fit closely enough therein to be guided in a rectilinear path when it is being moved and inasmuch as there are provided at least two fixed nuts 11 for the threaded shaft, the shaft will be likewise held to a rectilinear path and the shifting of the valve will be easily accomplished without excessive wear upon any of the parts. By removing the cover 9, the valve may be easily inserted downwardly through the box so as to be properly placed within the coupling and may likewise be readily removed when removal is necessary. The mechanism is exceedingly simple and the several parts may be very easily assembled or disassembled. The invention is designed more particularly for use with dredging machines where the discharge from the dredging machine is to be delivered through a plurality of shore lines and it may be very easily manipulated during operation of the dredge with full pressure on the line so that the flowing stream may be cut off from one place of deposit and directed to another place of deposit as the work progresses and the proper grading or regulating of the fill may proceed without any stoppage of the dredging. It is to be understood, however, that the use of the valve is not confined to dredging operations.

Having thus described the invention, I claim:

1. The combination with a Y-coupling having a transverse opening in the top of its outlet portion, a box upon the coupling at the said opening, a valve disposed within the outlet portion of the coupling and having a stem disposed within said box, and means connected with the stem and mounted on the box whereby to shift the valve to close either outlet of the coupling.

2. The combination with a Y-coupling having a transverse opening in the top of its outlet portion, a box on the top of the coupling at said opening, a disk valve arranged within the outlet portion of the coupling and having a flat tangential stem fitting within the said box and projecting beyond the end of the same, a cover secured over the box, a threaded shaft mounted in fixed bearings on the said cover, and a hanger secured to the projecting end of the valve stem and having a swiveled engagement with the said shaft.

In testimony whereof I affix my signature.

OLE P. ERICKSON. [L. S.]